(12) United States Patent
Olesen

(10) Patent No.: US 8,234,083 B2
(45) Date of Patent: Jul. 31, 2012

(54) WIND TURBINE ROTOR BLADE COMPRISING AN EDGE-WISE BENDING INSENSITIVE STRAIN SENSOR SYSTEM

(75) Inventor: Ib Olesen, Randers SV (DK)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 13/119,871

(22) PCT Filed: Sep. 22, 2009

(86) PCT No.: PCT/IB2009/007018
§ 371 (c)(1), (2), (4) Date: Apr. 14, 2011

(87) PCT Pub. No.: WO2010/032134
PCT Pub. Date: Mar. 25, 2010

(65) Prior Publication Data
US 2011/0184665 A1    Jul. 28, 2011

Related U.S. Application Data
(60) Provisional application No. 61/192,846, filed on Sep. 22, 2008.

(30) Foreign Application Priority Data
Sep. 22, 2008    (GB) .................................. 0817341.1

(51) Int. Cl.
*G01L 1/24* (2006.01)
(52) U.S. Cl. ................. 702/42; 702/41; 416/61; 356/32

(58) Field of Classification Search .............. 702/41–42; 416/61; 356/32
See application file for complete search history.

(56) References Cited

U.S. PATENT DOCUMENTS
| | | | |
|---|---|---|---|
| 4,387,993 | A | 6/1983 | Adrian |
| 4,671,659 | A | 6/1987 | Rempt et al. |
| 4,912,530 | A | 3/1990 | Bessho |
| 4,996,419 | A | 2/1991 | Morey |
| 5,009,505 | A | 4/1991 | Malvern |

(Continued)

FOREIGN PATENT DOCUMENTS
DD    253 669    1/1988

(Continued)

OTHER PUBLICATIONS
Intellectual Property Office, Search and Examination Report, Great Britain Application No. GB0817341.1; Jan. 12, 2009, 7 pgs.

(Continued)

*Primary Examiner* — Jonathan C Teixeira Moffat
*Assistant Examiner* — L. Anderson
(74) *Attorney, Agent, or Firm* — Wood, Herron & Evans, LLP

(57) ABSTRACT

A wind turbine rotor blade having a strain sensor system is described. The strain sensor is insensitive to the effect of twisting motions or edge-wise bending on the measurement of the strain. The sensor comprises one or more strain sensing devices arranged in a circular or regular polygon shaped path enclosing a region of the component. In the sensor system, a plurality of strain sensors are spaced longitudinally along a flap-wise axis of the wind turbine rotor blade.

14 Claims, 7 Drawing Sheets

U.S. PATENT DOCUMENTS

| | | | |
|---|---|---|---|
| 5,094,527 A | 3/1992 | Martin | |
| 5,160,976 A | 11/1992 | Carr et al. | |
| 5,201,015 A | 4/1993 | von Bieren et al. | |
| 5,250,802 A | 10/1993 | Runner | |
| 5,308,973 A | 5/1994 | Odoni et al. | |
| 5,488,475 A * | 1/1996 | Friebele et al. | 356/478 |
| 5,633,748 A | 5/1997 | Perez et al. | |
| 5,649,035 A * | 7/1997 | Zimmerman et al. | 385/13 |
| 5,726,744 A * | 3/1998 | Ferdinand et al. | 356/32 |
| 5,973,317 A | 10/1999 | Hay | |
| 6,125,216 A | 9/2000 | Haran et al. | |
| 6,301,968 B1 | 10/2001 | Maruyama et al. | |
| 6,586,722 B1 | 7/2003 | Kenny et al. | |
| 6,640,647 B1 * | 11/2003 | Hong et al. | 73/800 |
| 7,086,834 B2 * | 8/2006 | LeMieux | 416/1 |
| 7,703,331 B2 * | 4/2010 | Magne et al. | 73/800 |
| 2002/0057436 A1 | 5/2002 | Skinner et al. | |
| 2003/0066356 A1 | 4/2003 | Kanellopoulos et al. | |
| 2003/0127587 A1 | 7/2003 | Udd et al. | |
| 2004/0057828 A1 | 3/2004 | Bosche | |
| 2004/0114850 A1 | 6/2004 | Dewyntermarty et al. | |
| 2005/0088660 A1 | 4/2005 | Ronnekleiv | |
| 2005/0276696 A1 | 12/2005 | LeMieux | |
| 2006/0146337 A1 * | 7/2006 | Hartog | 356/478 |
| 2006/0285813 A1 | 12/2006 | Ferguson | |
| 2007/0223004 A1 | 9/2007 | Baillon et al. | |
| 2007/0280582 A1 * | 12/2007 | Sanders | 385/12 |
| 2007/0284112 A1 * | 12/2007 | Magne et al. | 166/336 |
| 2008/0013879 A1 | 1/2008 | Mossman | |
| 2008/0317598 A1 | 12/2008 | Barbu et al. | |
| 2009/0097976 A1 | 4/2009 | Driver et al. | |

FOREIGN PATENT DOCUMENTS

| | | |
|---|---|---|
| DE | 31 48 867 | 6/1983 |
| DE | 195 24 036 | 7/1996 |
| DE | 199 27 015 | 12/2000 |
| DE | 202 06 704 | 8/2002 |
| DE | 101 60 522 | 6/2003 |
| DE | 103 15 676 | 11/2004 |
| EP | 0 640 824 | 3/1995 |
| EP | 0 857 291 | 5/1997 |
| EP | 0 984 043 | 3/2000 |
| EP | 1 148 324 | 10/2001 |
| EP | 1 249 692 | 10/2002 |
| EP | 1 359 321 | 11/2003 |
| EP | 1 466 827 | 10/2004 |
| EP | 1 586 854 | 10/2005 |
| EP | 1 770 278 | 4/2007 |
| EP | 1 780 523 | 5/2007 |
| EP | 1 873 395 | 1/2008 |
| EP | 1 911 968 | 4/2008 |
| EP | 5 025 929 | 2/2009 |
| EP | 2 075 462 | 7/2009 |
| FR | 2 707 754 | 1/1995 |
| GB | 2 284 256 | 5/1995 |
| GB | 2 326 471 | 12/1998 |
| GB | 2 398 841 | 9/2004 |
| GB | 2 409 517 | 6/2005 |
| GB | 2 421 075 | 6/2006 |
| GB | 2 428 748 | 2/2007 |
| GB | 2 440 953 | 2/2008 |
| GB | 2 440 954 | 2/2008 |
| GB | 2 440 955 | 2/2008 |
| GB | 2466433 | 6/2010 |
| JP | 55-69006 | 5/1980 |
| JP | 58-153107 | 9/1983 |
| JP | 60-100707 | 6/1985 |
| JP | 1069922 | 3/1989 |
| JP | 6-117914 | 4/1994 |
| JP | 2000-111319 | 4/2000 |
| JP | 2003-302536 | 10/2003 |
| JP | 2007-114072 | 5/2007 |
| LV | 11378 B | 8/1996 |
| LV | 11389 B | 8/1996 |
| SU | 577394 | 10/1977 |
| SU | 780 654 | 3/1996 |
| WO | 97/15805 | 5/1997 |
| WO | 00/23764 | 4/2000 |
| WO | 00/28294 A1 | 5/2000 |
| WO | 00/39548 | 7/2000 |
| WO | 01/33075 | 5/2001 |
| WO | 02/053910 | 7/2002 |
| WO | 03/076887 | 9/2003 |
| WO | 2005/024349 | 3/2005 |
| WO | 2005/071382 | 8/2005 |
| WO | 2005/071383 | 8/2005 |
| WO | 2006/021751 | 3/2006 |
| WO | 2006/063990 | 6/2006 |
| WO | 2007/099290 | 9/2007 |
| WO | 2007/104306 | 9/2007 |
| WO | 2008/101496 | 8/2008 |
| WO | 2009/046717 | 4/2009 |

OTHER PUBLICATIONS

David Biloen; International Search Report and Written Opinion issued in priority International Application No. PCT/IB2009/007018; Oct. 7, 2010; 9 pages; European Patent Office.

David Biloen; International Preliminary Report on Patentability issued in priority International Application No. PCT/IB2009/007018; Mar. 7, 2011; 9 pages; European Patent Office.

Gareth John; Search Report issued in Great Britain Application No. GB0812037.0; Sep. 16, 2008; 4 pages; Great Britain Intellectual Property Office.

P. Ganci; International Search Report issued in International Application No. PCT/GB96/02606; Jan. 28, 1997; 2 pages; European Patent Office.

Robert MacDonald; Combined Search and Examination Report issued in Great Britain Application No. GB0812258.2; Nov. 7, 2008; 6 pages; Great Britain Intellectual Property Office.

Christopher Smith; Search Report issued in Great Britain Application No. GB0814651.6; Dec. 4, 2008; 1 page; Great Britain Intellectual Property Office.

Tony Oldershaw; Examination Report issued in Great Britain Application No. GB0814651.6; May 1, 2009; 2 pages; Great Britain Intellectual Property Office.

Tony Oldershaw; Combined Search and Examination Report issued in Great Britain Application No. GB0817341,1; Jan. 12, 2009; 4 pages; Great Britain Intellectual Property Office.

Lars Jakobsson; International Search Report issued in International Application No. PCT/NO03/00087; Jun3 10, 2003; 3 pages; European Patent Office.

Tony Oldershaw; Combined Search and Examination Report issued in Great Britain Application No. GB0822930.4; Mar. 26, 2009; 5 pages; Great Britain Intellectual Property Office.

James Paddock; Combined Search and Examination Report issued in Great Britain Application No. GB0913739.9; Nov. 30, 2009; 4 pages; Great Britain Intellectual Property Office.

Daniel Jones; Combined Search and Examination Report issued in Great Britain Application No. GB1004162.2; Sep. 13, 2010; 8 pages; Great Britain Intellectual Property Office.

Mike Walker; Combined Search and Examination Report issued in Great Britain Application No. GB1001855.4; Mar. 22, 2010; 7 pages; Great Britain Intellectual Property Office.

* cited by examiner

WIND TURBINE ROTOR BLADE COMPRISING AN EDGE-WISE BENDING INSENSITIVE STRAIN SENSOR SYSTEM

This application is a national stage entry of International Application No. PCT/IB2009/007018, filed on Sep. 22, 2009, which claims the benefit of GB 0817341.1, filed on Sep. 22, 2008, and U.S. Provisional Application No. 61/192,846, filed on Sep. 22, 2008. Each of these applications is incorporated by reference herein in its entirety.

The invention relates to a wind turbine rotor blade optical fibre sensor system and to a method for detecting deformation in a wind turbine rotor blade, and particularly to a sensing system and method that are insensitive to edge-wise bending.

FIG. 1 illustrates a wind turbine 1, comprising a wind turbine tower 2 on which a wind turbine nacelle 3 is mounted. A wind turbine rotor 4 comprising at least one wind turbine rotor blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model usage, such as those that are suitable for use in large scale electricity generation on a wind farm, for example. In the latter case, the diameter of the rotor could be as large as 100 meters or more.

Wind turbine components are subject to deformation or strain from a number of sources, such as the accumulation of particulates like dirt or ice, their own weight, and the force exerted by the wind itself. Consequently, it is important that the strain on components be monitored to ensure that they remain fit to operate over their intended working lives.

A number of different techniques for measuring strain on wind turbine components are known, including electro-resistive sensors, and more frequently, opto-electronic sensors comprising optical fibres. To measure the strain on the component as a whole, a plurality of similar sensors will typically be used, located at different points along the length of the component. By measuring the local strain at each location, the total strain on the component can then be calculated.

It is often desired to monitor the strain on a wind turbine component in the direction of its longest dimension, as this is the direction in which the component is most susceptible to bending moments that may, if excessive, cause structural failure. In the case of wind turbine blades, this type of bending is referred to as flap-wise bending.

It is desirable to measure how much the blade is bending in the flap-wise direction, due to the pressure of the wind or other factors, to avoid failure of the blade and to avoid the blade striking the wind turbine tower as it turns through the lowest point of its rotation. For blades, therefore, the sensors are often mounted in the longitudinal direction inside the blade.

Although in many cases the strain in only a particular direction is of interest, mounted strain sensors may be affected by components of strain in a number of different directions, and give misleading results. In high wind situations for example, a blade may twist or deform in directions that are perpendicular to its length, such as laterally, or perpendicularly to the blade surface. This is often referred to as edge-wise bending. Edge-wise bending does not typically affect the lifetime of the blade and so is often not of interest for monitoring purposes. However, if not accounted for, edge-wise bending (or more generally in this application, bending in a non-longitudinal direction of a wind turbine component) could indicate a strain in the length wise direction of a wind turbine component that is greater than the actual value. Edge-wise bending may therefore include twisting movements, and can be distinguished from pure strain which is strain resulting from deformation that results in a net increase in length.

In theory, it is possible to find ideal spots for mounting the sensors, such that each sensor will only measure the strain at that location and be unaffected by edge-wise bending. However, these ideal spots are hard to find in practice and can differ from blade to blade. As a result, strain measurements can be unreliable.

We have therefore appreciated that there is a need for an improved strain sensor, which is insensitive to twisting movements and edge-wise bending.

SUMMARY OF THE INVENTION

According to a preferred aspect of the invention, there is provided a wind turbine rotor blade comprising a sensor system for detecting the flap-wise strain on the rotor blade, the sensor system comprising: a plurality of strain sensors spaced longitudinally along a flap-wise axis of the wind turbine rotor blade, wherein each strain sensor comprises one or more strain sensing devices arranged in a sensor path that encloses a region of the rotor blade, the sensor path having a rotational symmetry of order three or more; and one or more processors arranged to: receive a signal from the plurality of strain sensors; for each strain sensor, calculate a value of strain for the region of the rotor blade enclosed by the sensor path, based on a change in length of the sensor path as the wind turbine rotor blade deforms; and based on the strain calculated for each strain sensor, determining the flap-wise strain for the rotor blade. The path may be circular, in the shape of a regular polygon, or a star for example.

Each of the strain sensors comprises one or more sensing devices arranged in a path with rotational symmetry of order three or more, such as a circular path, a regular polygonal shaped or star shaped path that encloses a region of the component. This means that the effect of a twisting motion or of edge-wise bending on the strain measurement is at least partly averaged out over the symmetrical area of the region, and means that the error in the measurement of pure or directional strain is reduced. By arranging a plurality of these strain sensors along the longitudinal axis of the wind turbine blade, the flap or span-wise strain on the wind turbine blade can be measured more accurately, independently of any edge-wise bending effects.

Further, measurement of the strain over an extended region of the component reduces the likelihood of measurement anomalies, such as where a strain sensor is located at a position experiencing a strain that is not characteristic of the rest of the surrounding area of the component.

Advantageously, the rotor blade is provided with strain sensors that comprise a single strain sensing device, and the single strain sensing device comprises a single interferometric optical fibre strain sensor arranged to form the entirety of the circular or regular polygonal shaped path.

In this way, a measurement of the total length of the path can be readily determined using the interferometric optical fibre strain sensor, and knowing the original length of the path easily converted into a measurement of strain greatly simplifying the processing steps.

Alternatively, the rotor blade may comprise strain sensors that include more than one strain sensing device arranged to determine the strain between equally spaced points along the circular or regular polygon shaped path. Such sensors do not require interferometric optical fire strain sensors to operate (although such sensors are advantageously used), and may therefore include other types of strain sensors.

Advantageously, the regular polygon shaped path is an equilateral triangle. This configuration provides the improvement of the invention without requiring a complex arrangement of sensors. It will be appreciated that in a triangular arrangement, at least one strain sensing device is effectively used to cancel out the effect of edge-wise bending or twisting leaving the other sensor to calculate the pure strain.

Advantageously, the strain sensor system comprises a single processor arranged to receive signals from the one or more strain sensors. In this way, only the unprocessed output from each of the strain sensors needs to be transmitted to the processor, and processing can be performed centrally. Alternatively, the strain sensor system may comprise a respective processor for each strain sensor.

A corresponding method is provided.

BRIEF DESCRIPTION OF THE DRAWINGS

Preferred embodiments of the invention will now be described, by way of example, and with reference to the drawings in which.

DETAILED DESCRIPTION OF PREFERRED EMBODIMENTS

A preferred embodiment of the invention comprises a wind turbine rotor blade having a strain sensor system that can more accurately detect strain in the flap-wise direction, by virtue of totally or at least partly eliminating an undesired component of strain in the edge-wise direction.

In order to further illustrate the nature of the problem addressed by the invention, reference will now be made to FIG. 2 which is a diagram showing of a square surface element under stress.

The square ABCD at the top of the diagram illustrates a surface element of a wind turbine component. It can be assumed for the purposes of this discussion that the direction of interest for measurement of strain is the direction AD or CB, and that this direction corresponds to the lengthwise direction in a wind turbine component. Extension or elongation of the sides AD or CB results in a stretch of the surface element ABCD and a resulting strain.

Figure 1:
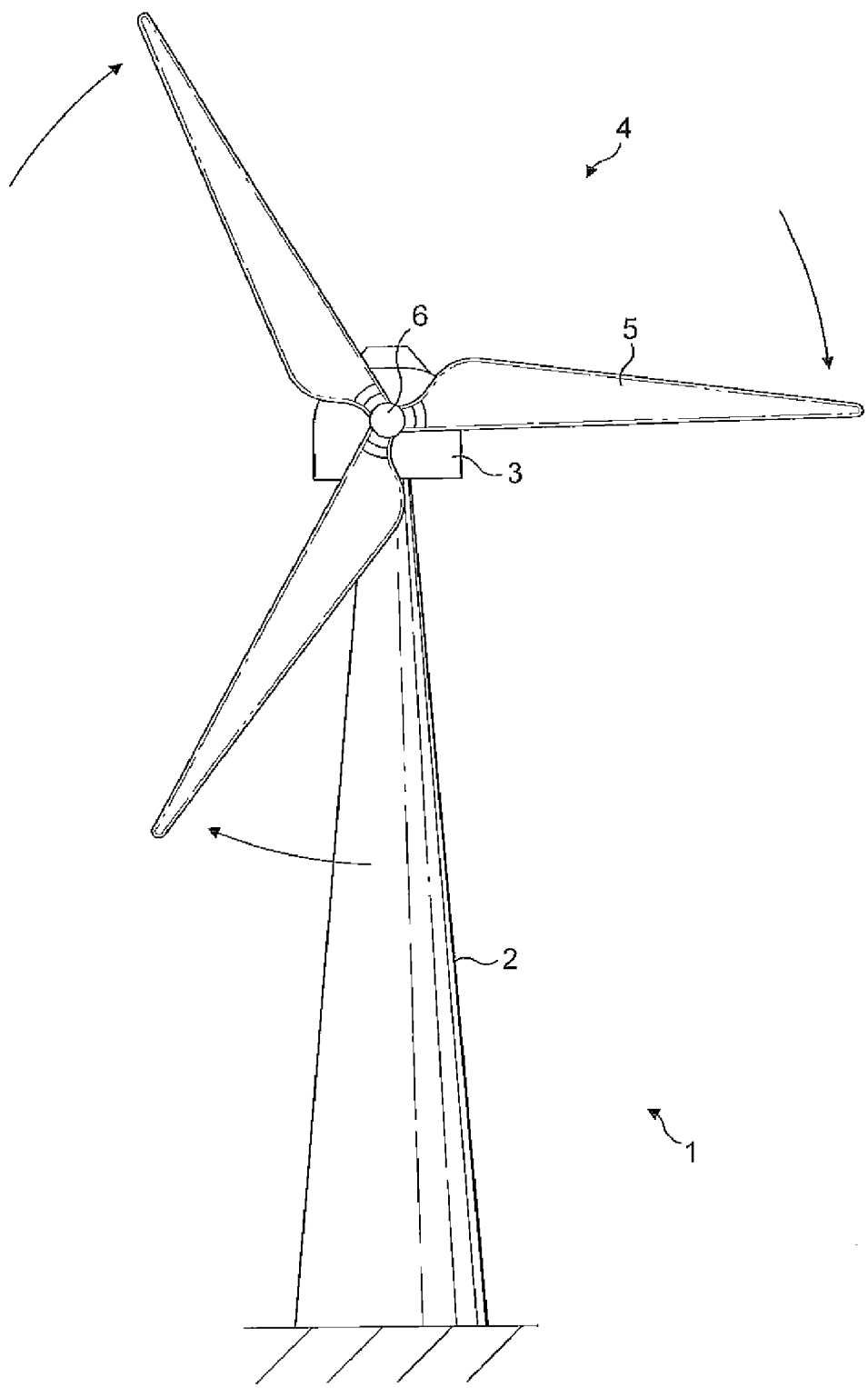
FIG. 1 illustrates a known wind turbine.
Figure 2:
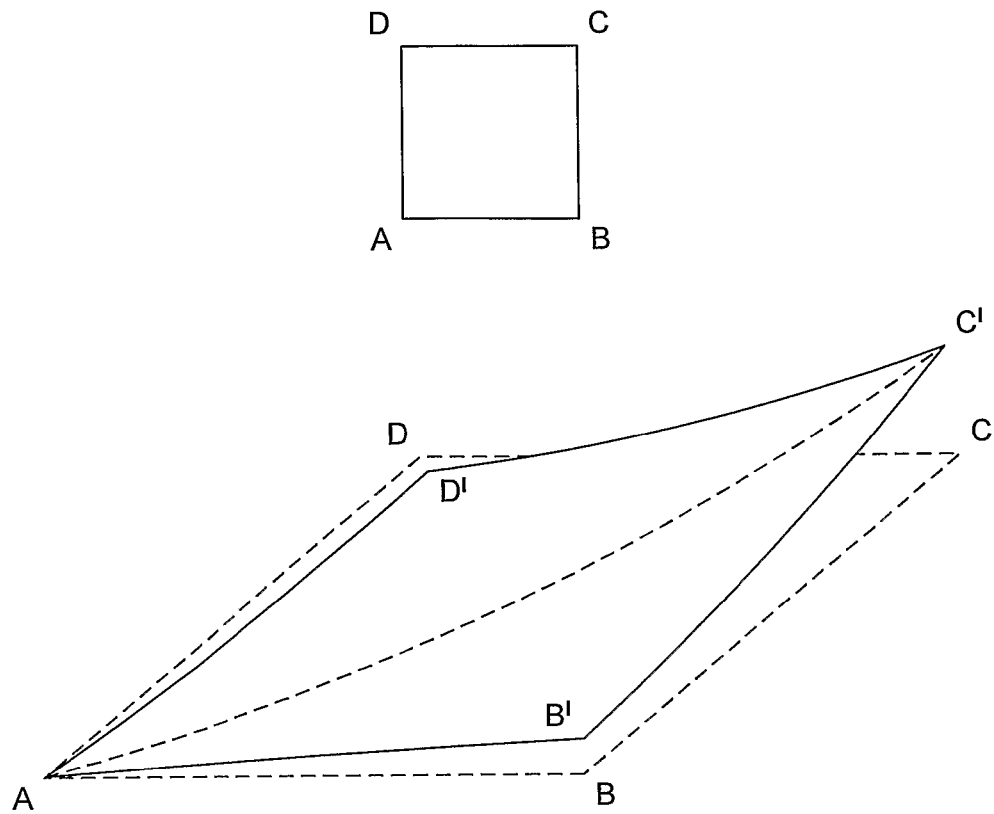
FIG. 2 is a schematic illustration of a surface element exposed to strain.

The isometric view at the bottom of FIG. 2 shows the same square surface element ABCD, but in the situation where the corner C has been displaced vertically to point C'. The surface element is assumed to be elastic, but not completely so. This means that as the corner C is lifted, the distance AC' will increase according to the applied force and the elasticity of the material, but also that corner C will curve back slightly towards the corner A.

As the distance AC' increases, the corners B and D will be pulled in slightly towards the centre line by the strain acting along line BC' and DC' and will adopt new positions B' and D'. From the top, the view of the original square shape ABCD will now be a diamond shape AB'C'D'.

As the distance AC' is greater than the original distance AC a strain sensor mounted in this direction will detect a strain. However, this strain results from a twisting force that is not of interest as far as monitoring deformation in the lengthwise direction of the wind turbine component is concerned.

Strain sensors perfectly aligned with edges BC and AD would be largely insensitive to the strain in the direction AC', as the lengths of BC and AD change only slightly in comparison with the stretch along AC. However, as in practice the nature and direction of any non-lengthwise displacement is not easy to predict, it is unlikely that the strain sensors will be located in such a way that they are largely insensitive to the unwanted component of strain. As noted above, finding the ideal spot to isolate the sensors is difficult, and it is just as likely that they are orientated on an element of surface susceptible to strain in the direction AC'.

Figure 3:
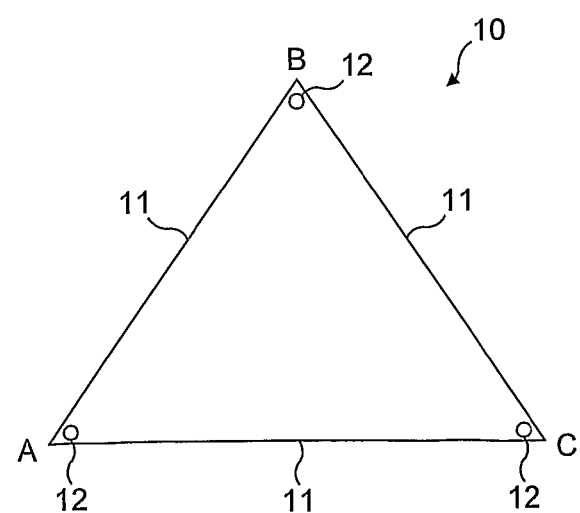
FIG. 3 is a schematic illustration of an embodiment of a strain sensor having a triangular sensor path according to the invention.
Figure 3A:
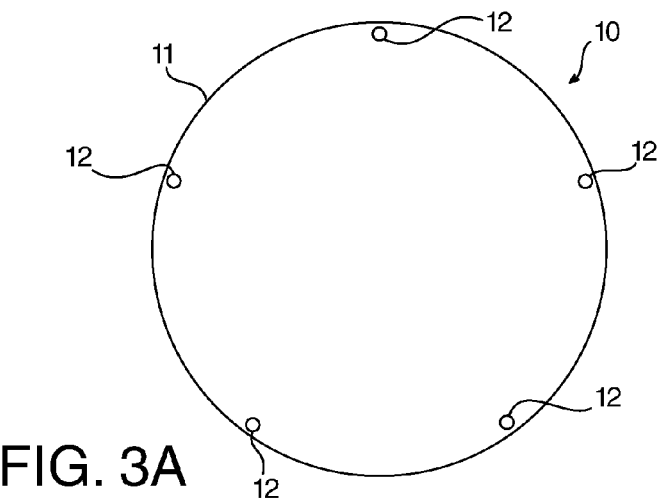
FIG. 3A is a schematic illustration of an embodiment of a strain sensor having a circular sensor path according to the invention.
Figure 3B:
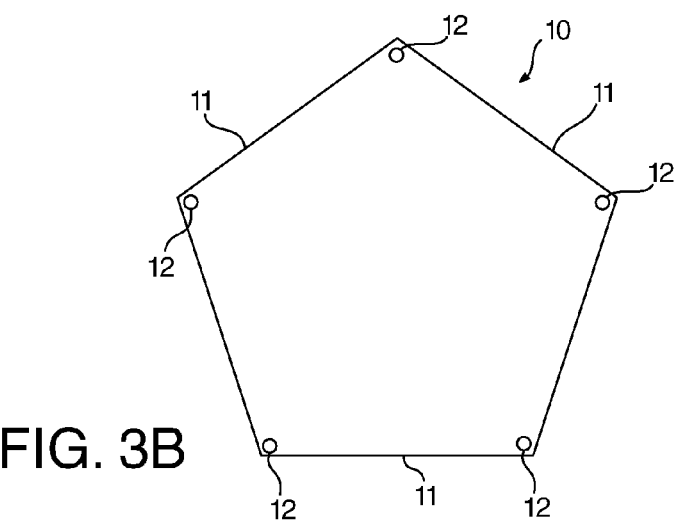
FIG. 3B is a schematic illustration of an embodiment of a strain sensor having a regular polygon shaped sensor path according to the invention.
Figure 3C:
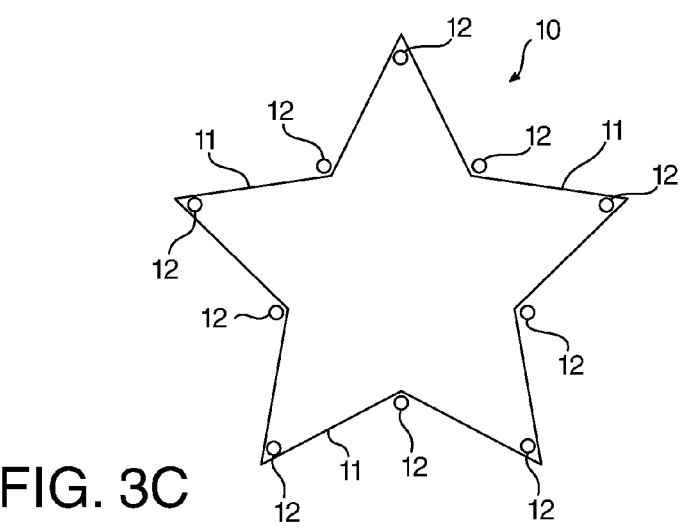
FIG. 3C is a schematic illustration of an embodiment of a strain sensor having a star shaped sensor path according to the invention.
Figure 3D:
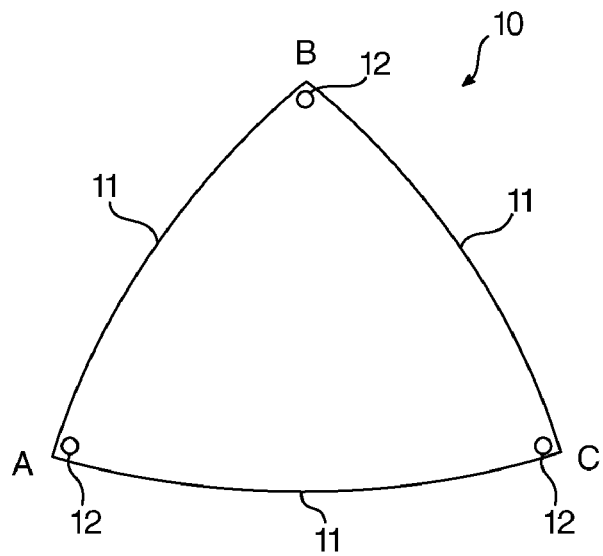
FIG. 3D is a schematic illustration of an embodiment of a strain sensor having a concave sensor path according to the invention.
Figure 3E:
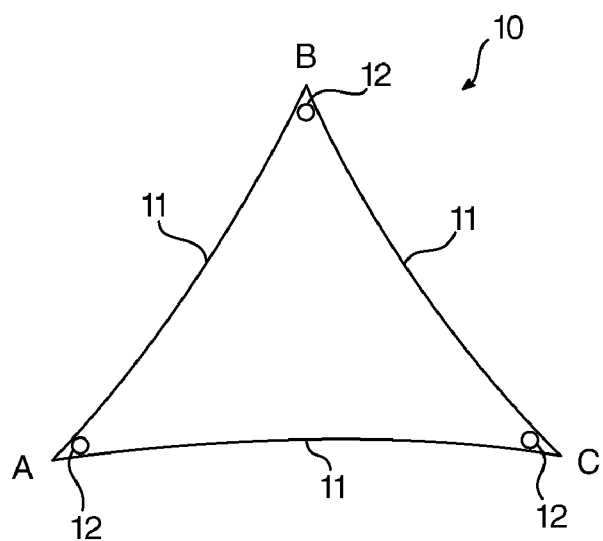
FIG. 3E is a schematic illustration of an embodiment of a strain sensor having a convex sensor path according to the invention.

The preferred example embodiment of the invention addresses this problem and provides a strain sensor that is insensitive to twisting or edge-wise bending. Referring to FIG. 3, the example sensor comprises a triangular arrangement 10 of strain sensor components 11 extending between sensor connection points 12. The sensor connection points comprise suitable connection means for affixing the sensor components to the internal or external surface of the wind turbine component, such as brackets for receiving screws, pins or other fasteners, or sites for receiving adhesive. The sensor connection points form the corners of the triangle ABC, and the strain sensor components are identical in length so that the triangle is therefore equilateral.

The sensor components 11 can be any strain sensing device suitable for measuring the strain along the individual sides AB, BC and CA of the triangle, or along the total length of the periphery ABC. Suitable strain sensors include mechanical, electro-resistive, optical and opto-electronic devices, although interferometric optical strain sensors are most advantageous as will be described below.

Optical and opto-electronic strain sensors comprise optical fibres mounted on the component such that deformation of the component in a direction of interest results in a change in length of the optical fibre. Light is input into one end of the fibre and detected at one end or the other by a light detector. The change in optical length of the optical fibre can be determined by measuring, variations in the light output from the fibre, and converting this into an indication of strain. Although a number of different optical fibre strain sensors are known, Interferometric sensors are preferred in this case as they provide more accuracy of measurement.

In interferometric sensors, the light travelling in the optical fibre is split into optical paths, one of which is insulated from the deformation and one which is not. The light is subsequently recombined and interferes constructively or destructively according to the different in phase between the two light signals. By varying the wavelength of the input light slightly, variations in the intensity are produced and can be counted to give an indication of the variation in optical path length. A more detailed discussion is given in the applicant's co-pending application GB 0812037.0, a section of which is repeated below for reference. Interferometric sensors can be used to give a direct measurement of the length between two points.

Figure 4:
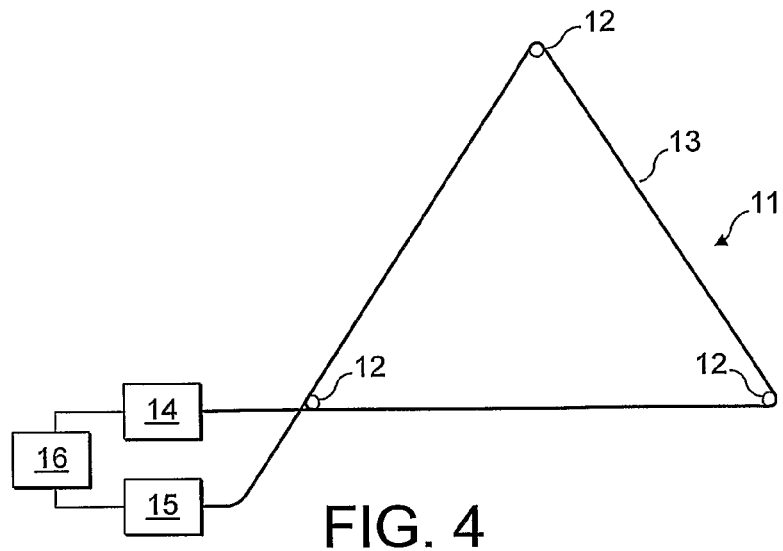
FIG. 4 is a simplified illustration of a first example embodiment.

A preferred example of the invention will now be described with reference to FIGS. 4 and 5. FIG. 4 shows an embodiment of the general case shown in FIG. 3, in which the strain sensor components 11 are provided by a single optical fibre 13 that is wound around connection points 12 to form the triangular path. Light is input into one end of the optical fibre 13 using a light emitting device 14, such as an LED, laser, halogen or metal halide source, and is detected at the other using a light collecting device 15, such as a photo-sensor. The light emitting device 14 is connected to one end of the fibre optic cable 13 to input light into the fibre 13, and the light measuring device 15 connected to the other to receive light transmitted along the fibre 13. A controller 16 which may also process the results is connected to both light emitting device 14 and light measuring device 15. In practice, the fibre 13 may be wound around the triangular periphery defined by points ABC several times in order to increase the sensitivity of the fibre optic to small changes in length.

Figure 5:
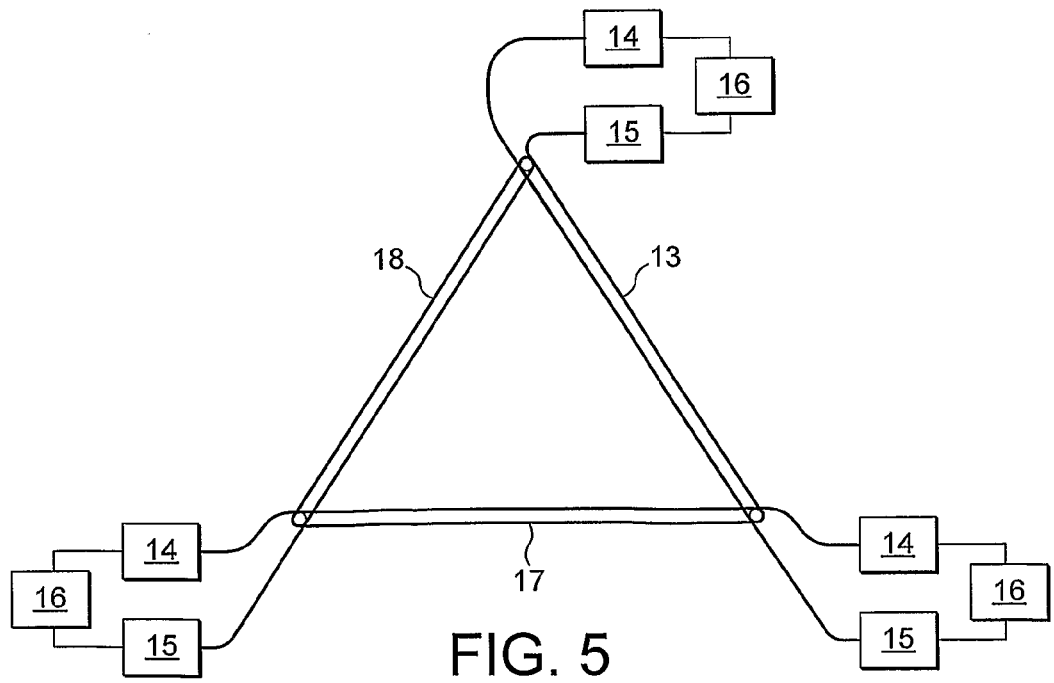
FIG. 5 is a simplified illustration of a second example embodiment.

An alternative arrangement is shown in FIG. 5, in which each of sensor component 4 comprises a separate optical fibre 13, 17 and 18, with respective light emitting device 14, light detector 15 and controller 16. Again, the separate optical fibres may be wound around the connection points AB, BC and CD several times in order to increase their sensitivity to small changes in length.

The operation of the sensor will now be described in more detail. The sensors shown in both FIGS. 4 and 5 are configured to determine the respective lengths of the sides of the triangle ABC. The total change of the lengths of the sides gives a value that is indicative of the strain on the enclosed area of surface. Furthermore, this value is largely insensitive to twisting or edge-wise bending. This can be understood from FIG. 2, where it will be appreciated that if the area is exposed to strain in the direction AD and BC, the area will increase, while twisting will give very little change in area, as the other points of the surface element move and compensate.

Figure 6:
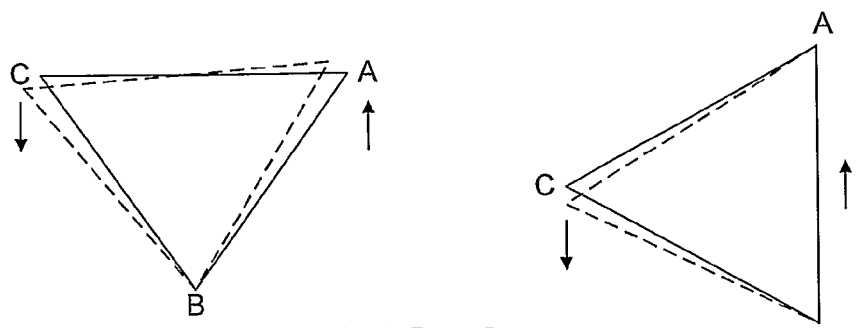
FIG. 6 is a schematic illustration showing the effect of a twisting motion or edge-wise bending.

FIG. 6 shows the effect of twisting or edge-wise bending on the triangular sensor arrangement of FIGS. 4 and 5 in more detail. The dotted line indicates the original configuration, and the solid line the result after a non-length wise displacement. In the first example, the corners A and C are shown subject to a non-length wise displacement that causes them to be displaced in opposite directions around an intermediate point. The location of this point is irrelevant and may be on the line AC or not. As can be seen from the diagram, the result is that the side AC does not significantly change in length, unless the displacement of points A and C is very large, and the triangular arrangement becomes less equilateral.

In the second example, the corners A and B are displaced in one direction, while the corner C is displaced in another. The lengths AC and CB will be made respectively slightly smaller and slightly longer by the displacement, but will largely cancel each out while the triangle remains equilateral. The length AB will not be significantly affected by the displacement.

Figure 7:
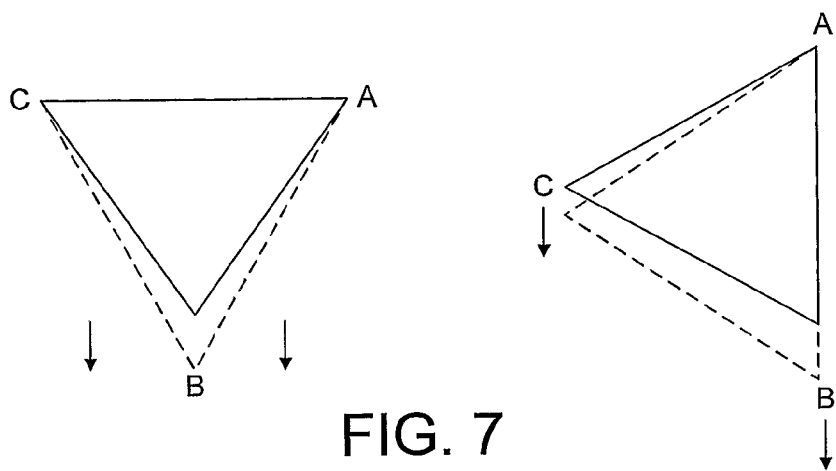
FIG. 7 is a schematic illustration showing pure strain in the direction of interest.

Both of these examples show that when measuring the sum of the length of the sides, non-length wise displacement causes very little disturbance. On the other hand, FIG. 7 shows the effect on the strain sensor of pure displacement. In the first example, one corner B moves away from the other corners. This results in the BC and AB becoming significantly longer, while the side AC remains unchanged. This strain will result in a change to the sum of the three sides.

The same is true for the case shown in the second example, in which the corners C and B, and therefore the side CB, move away from the corner A. As a result, the side AC and BC both become a little longer, while the side AB parallel to the stress becomes much longer.

Figure 8:
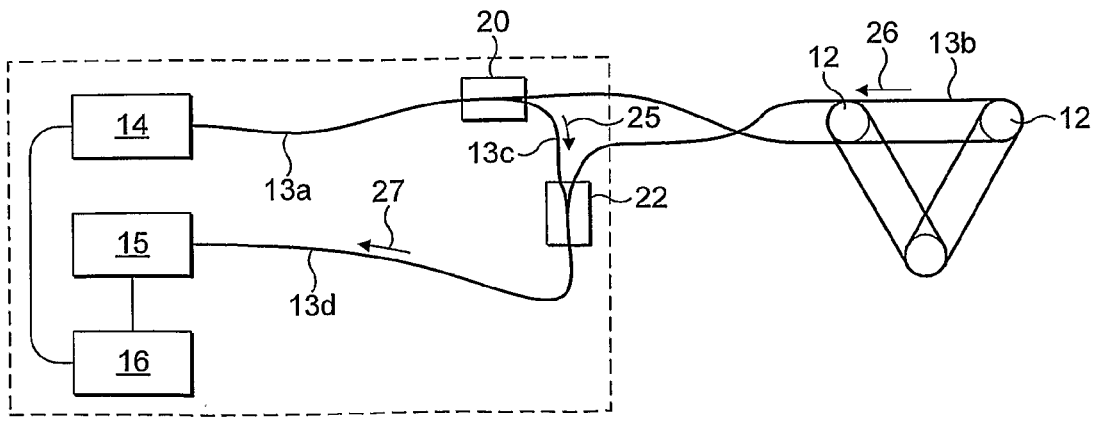
FIG. 8 is a schematic illustration of an interferometric strain sensor

As noted above, any strain sensor for measuring the length of the sides of the triangle, or for measuring the strain along the sides may be used. An example embodiment of an interferometric sensor that may be used in the arrangements of FIGS. 4 and 5 will now be described with reference to FIG. 8. This sensor is discussed in our application 0812037.0 along with alternative embodiments that may also be used with the present invention.

The example interferometric fibre optic sensor comprises light splitting device 20 and light adding device 22 located in the path of the optical fibre 13. The optical fibre 13 is connected to input and output portions of the light splitting 20 and adding devices 22, and is accordingly comprised of separate optical fibre portions 13a, 13b, 13c, and 13d. Although, these portions are separate optical fibres, it is helpful to think of them as a forming a single fibre element 13 for the purpose of the present discussion.

Optical fibre 13b extends around the connection points 6 and is the portion of the fibre subject to strain in the component. It is therefore much longer than portions 13a, 13c and 13d that connect the splitter 20 and the adder 22 to the light emitting device 14 and to the light measuring device 15. It is assumed that the lengths of the fibres 13a, 13c, and 13d result in an essentially negligible delay in the light received from optical source 14.

The interferometric strain sensor operates to detecting the length of the optical fibre. Light emitting device 14 inputs light having a single uniform wavelength into the optical fibre 13a. First portion 13a connects the light emitting device 14 to the input terminal of the light splitting device 20 or optical splitter. The optical splitter 20 divides the light received at its input terminal into two equal output signals. Second optical fibre portion 13b is connected to one output terminal of the splitter 20 and therefore receives a light signal 25, having a first phase, from the light emitting device 14 and fibre portion 13a. The second optical fibre portion 13b extends around the mounts 6 and is the portion of the fibre subject to strain in the component. Its other end connects to the input terminal of light adding device 22. It will be appreciated that optical splitter and adder could be provided in a single optical coupler, and are shown separately here for clarity.

The other input terminal of light adding device 22 is connected to optical fibre 13c, which in turn is connected to the other output terminal of splitter 20. At one terminal, the optical adding device therefore receives the light signal 25, and at the other it receives light signal 26, having a second phase. The second phase is different to the first phase, as the light signal 26 has travelled along the longer optical fibre portion 13b. In light adding device 22, the two light signals 25 and 26 are added together, and the resulting light signal 27 is sent to light measuring device 15, via optical fibre 13d connect to the output terminal of adder 22.

The light measuring device 15 detects the intensity of the light signal 27 received at its input terminal. The intensity of the received light 27 will depend on the relative phases of the two light signals 25 and 27, and whether their relative phases result in constructive or destructive interference.

When the optical fibre 13b is in an unstrained state, the intensity of the light received at the input to light detector 15 is determined. This intensity may be considered a zero or a rest value for the purposes of calibrating the sensor. Further, as the relative phase of the two light signals 25 and 26 is a function of the wavelength of light and the optical path length along fibre 13b, and to a lesser extent fibres 13c and 13d, the resting intensity value of the sensor may be tuned to a desired value by adjusting the wavelength of the input light signal 25.

The controller can determine the length of the fibre by controlling the light emitting device 14, to slowly vary the wavelength of the input light signal 25. It is preferred if the total variation in wavelength during the sensing process is small, say 1000 parts per million, or 0.1%. As the wavelength is varied, the controller monitors the intensity at the light detector 15, and detects the cyclical variation in intensity caused by the change in phase. The controller counts the number of times the relative phase of the two signals 25 and 26 changes by 360 degrees, a complete cycle. The controller 15 may count each cycle in phase by determining how many times the maximum (or minimum) intensity is reached.

After the controller 12 has completed varying the wavelength, the total number of phase cycles detected is used to determine the length of the optical fibre. For example, if varying the wavelength of the input light 25 by 0.1% results in detection of 500 complete phase cycles, then the length of the fibre can be determined, to a reasonable degree of accuracy, as:

$$\text{length} = \text{number of phase cycles} \times (\text{variation})^{-1} \times \text{wavelength}$$

$$= 500 \times (0.001)^{-1} \times \text{wavelength}$$

Length=length of fibre being measured;
Number of phase cycles=number of phase cycles detected;
Variation=percentage change in input wavelength of light for measurement purposes; and
Wavelength=initial wavelength of light subject to variation.

Thus, for red light in the fibre with a wavelength of 700 nm, the length of the fibre can be determined as:

$$= 500000 \times 7 \times 10^{-7}$$

$$= 0.35 \text{ m.}$$

Other techniques may be used to measure the length of the optic fibre 13b. In one example, a pulse of light may be input into optic fibre 13a, and the time taken for the pulse to travel along the two optical paths to the sensor is recorded. A further implementation is to input white light into the optic fibre 13a, and to use an interrogator to analyse the interference pattern. The optical path length travelled by the light in an optical fibre will be different according to the wavelength of the light. Different wavelengths of light will therefore be received at the detector at different phases according to the path travelled and will interfere with each other constructively or destructively. The effect is like an interference pattern for a single wavelength of light, and has a sinusoidal shape. It is however a result of the interference of different wavelengths.

Although a triangular formation of strain sensing devices has been described in the examples above it will be appreciated that this formation is a simple case of a more general formulation in which the path could be any path with rotational symmetry of order three or more, such as circular paths, regular polygonal shapes, such as triangles, squares, pentagons, hexagons etc, or stars. The path may be convex or concave.

It will be appreciated that in a triangular arrangement, at least one of the strain sensing devices is effectively used to cancel out the effect of non-length wise displacement or twisting leaving the other sensor to calculate the pure strain.

All of the regular polygonal paths have sides of equal length. This is a key point, as if the sides of the path were not of equal length it would be difficult to separate the components of edge-wise bending or twisting motion experienced by each of the respective sensing sides. If a rectangular shape was used for example then the sensor would be more susceptible to displacement that acted in a direction parallel to that of the longest sides. With a square sensor, the equal lengths of the sides means that the change in length of the sides non-parallel to the force of the non-length wise displacement at least partly compensates for the change in length of the sides that are parallel. It will be appreciated that the circle represents a regular polygon in which the length of the sides tends to zero, and the number of sides tends to infinity.

Figure 9:
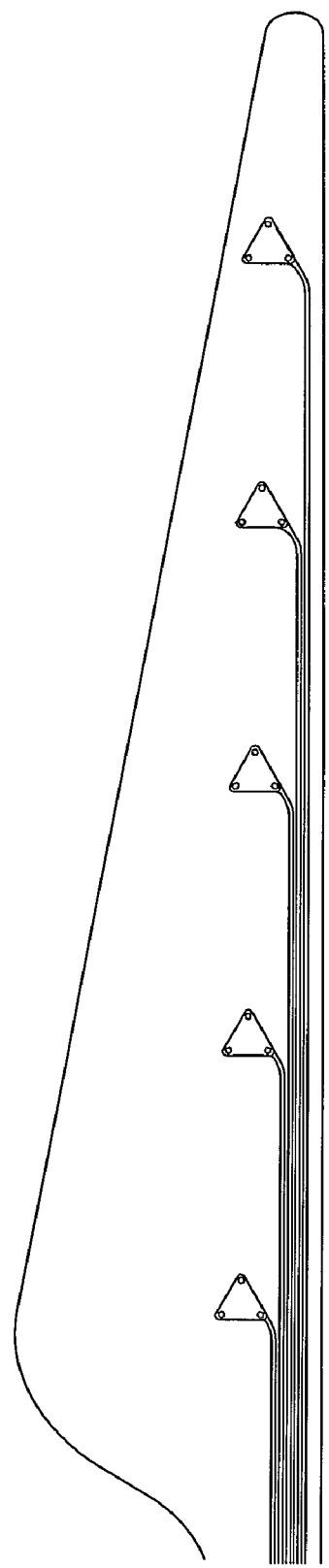
FIG. 9 is a schematic illustration of wind turbine rotor blade according to an example of the invention.

FIG. 9 illustrates a wind turbine rotor blade strain sensor system according to an example embodiment of the invention. The strain sensing system comprises one or more sensors located at different longitudinal positions on a wind turbine rotor blade. The sensor path may be provided on the outside or inside surface of the wind turbine rotor blade, or embedded inside the laminate of the component itself, to enclose a region of the component where the strain is to be measured.

The sensor system comprises at least one processor to receive the strain measurements and analyse the results. In FIG. 9, one processor is provided in the rotor hub or near the blade root to receive data from the plurality of sensors. The measurements may be measurements of actual strain, or may be measurements that indicate an increase in length. Where measurements indicate an increase in length, the measurements from respective strain sensing devices can simply be added to give the total length of the path periphery. If Fibre Bragg Grating sensors are used, it will be appreciated that the measurements from each of the sides of the regular polygonal path will be of the wavelength of light reflected (or transmitted) by the Bragg grating. In order to use these measurements, it is advantageous to convert the wavelengths from individual sensors to indications of length so that they can easily be added together. The same is true of resistivity based measurements of strain. Processors may therefore be provided at each sensor location and connected together, and optionally to a central processor, for manipulating the results, or alternatively a single processor may be provided to receive the raw data.

The invention has been described with reference to example implementations, purely for the sake of illustration. The invention is not to be limited by these, as many modifications and variations would occur to the skilled person. The invention is to be understood from the claims that follow.

The invention claimed is:

1. A wind turbine rotor blade comprising a sensor system for detecting the flap-wise strain on the rotor blade, the sensor system comprising:
   a plurality of strain sensors spaced longitudinally along a flap-wise axis of the wind turbine rotor blade, wherein each strain sensor comprises one or more strain sensing devices collectively defining a sensor path that encloses a region of the rotor blade, wherein the one or more strain sensing devices are positioned on the rotor blade such that the sensor path is circular, in the shape of a regular polygon, or in the shape of a star, such that the sensor path has a rotational symmetry of order three or more, and such that any flap-wise strain applied to the strain sensor is reflected by measurements of the one or more strain sensing devices while any edge-wise strain applied to the strain sensor is canceled out by measurements of the one or more strain sensing devices, thereby rendering a measurement sensitive to only flap-wise strain; and one or more processors arranged to:
receive a signal from the plurality of strain sensors;
for each strain sensor, calculate a value of strain for the region of the rotor blade enclosed by the sensor path based on a determined change in total length of the sensor path as the wind turbine rotor blade deforms; and
based on the strain calculated for each strain sensor, determine the flap-wise wise strain for the rotor blade.

2. The rotor blade of claim 1, wherein the strain sensors comprise a single strain sensing device, and wherein the single strain sensing device comprises a single interferometric optical fibre arranged to form the entirety of the circular, regular polygon, or star shaped sensor path.

3. The rotor blade of claim 1, wherein the strain sensors comprise more than one strain sensing device arranged to determine the strain between equally spaced points along the circular, regular polygon, or star shaped sensor path.

4. The rotor blade of claim 1, wherein the regular polygon shaped path is an equilateral triangle.

5. The rotor blade of claim 1, comprising a single processor arranged to receive signals from the one or more strain sensors.

6. The rotor blade of claim 1, comprising a respective processor for each strain sensor.

7. A wind turbine comprising the rotor blades of claim 1.

8. A method of detecting the flap-wise strain on a wind turbine rotor blade, comprising:
receiving a signal at one or more processors from a plurality of strain sensors mounted at longitudinally spaced positions along the flap-wise direction of the wind turbine rotor blade, wherein each strain sensor comprises one or more strain sensing devices collectively defining a sensor path that encloses a region of the rotor blade, wherein the one or more strain sensing devices are positioned on the rotor blade such that the sensor path is circular, in the shape of a regular polygon, or in the shape of a star, such that the sensor path has a rotational symmetry of order three or more, and such that any flap-wise strain applied to the strain sensor is reflected by measurements of the one or more strain sensing devices while any edge-wise strain applied to the strain sensor is canceled out by measurements of the one or more strain sensing devices, thereby rendering a measurement sensitive to only flap-wise strain; and calculating, at the one or more processors, a value of strain for each strain sensor for the region of the rotor blade enclosed by the sensor path, based on a determined change in total length of the sensor path as the wind turbine rotor blade deforms; and based on the strain calculated for each strain sensor, determining, at the one or more processors, the flap-wise strain for the rotor blade.

9. The method of claim 8, wherein the strain sensors comprise a single strain sensing device, and wherein the single strain sensing device comprises a single interferometric optical fibre arranged to form the entirety of the circular, regular polygon, or star shaped sensor path.

10. The method of claim 8, wherein the strain sensors comprise more than one strain sensing device arranged to determine the strain between equally spaced points along the circular, regular polygon, or star shaped sensor path.

11. The method of claim 8, wherein the regular polygon shaped path is an equilateral triangle.

12. The method of claim 8, comprising providing a single processor arranged to receive signals from the one or more strain sensors.

13. The method of claim 8, comprising providing a respective processor for each strain sensor.

14. The method of claim 8, comprising mounting the plurality of strain sensors at longitudinally spaced positions along the flap-wise direction of the wind turbine rotor blade.

* * * * *

UNITED STATES PATENT AND TRADEMARK OFFICE
CERTIFICATE OF CORRECTION

| | | |
|---|---|---|
| PATENT NO. | : 8,234,083 B2 | Page 1 of 1 |
| APPLICATION NO. | : 13/119871 | |
| DATED | : July 31, 2012 | |
| INVENTOR(S) | : Ib Svend Olesen | |

It is certified that error appears in the above-identified patent and that said Letters Patent is hereby corrected as shown below:

In the Claims

Claim 1
Column 9, line 23, "determine the flap-wise wise strain" should be -- determine the flap-wise strain --

Signed and Sealed this
Sixteenth Day of December, 2014

Michelle K. Lee
*Deputy Director of the United States Patent and Trademark Office*